United States Patent [19]

Bergles

[11] Patent Number: 4,577,531
[45] Date of Patent: Mar. 25, 1986

[54] MULTI-RATIO DRIVE HUB FOR BICYCLES WITH AT LEAST THREE DIFFERENT DRIVE TORQUE PATHS

[75] Inventor: Eduard Bergles, Graz, Austria

[73] Assignee: Fichtel & Sachs AG, Schweinfurt, Fed. Rep. of Germany

[21] Appl. No.: 585,891

[22] Filed: Mar. 2, 1984

[30] Foreign Application Priority Data

Mar. 5, 1983 [DE] Fed. Rep. of Germany ....... 3307820
Feb. 28, 1984 [DE] Fed. Rep. of Germany ....... 3407164

[51] Int. Cl.⁴ .......................... F16H 3/44; F16H 57/10
[52] U.S. Cl. ................................. 74/781 B; 74/750 B
[58] Field of Search ................ 74/781 B, 781 R, 368, 74/750 B

[56] References Cited

U.S. PATENT DOCUMENTS

| | | | |
|---|---|---|---|
| 3,809,195 | 5/1974 | Schultz et al. | 192/6 A |
| 3,828,627 | 8/1974 | Schwerdhofer | 74/750 B |
| 4,059,028 | 11/1977 | Schulz et al. | 74/781 B |
| 4,065,984 | 1/1978 | Nakajima | 74/781 B X |
| 4,069,725 | 1/1978 | Segawa | 74/781 B X |
| 4,240,533 | 12/1980 | Fukui | 74/750 B X |
| 4,320,672 | 3/1982 | Segawa | 74/750 B |

FOREIGN PATENT DOCUMENTS

| | | | |
|---|---|---|---|
| 233401 | 9/1963 | Austria | 74/781 B |
| 2940841 | 4/1981 | Fed. Rep. of Germany | |
| 415402 | 10/1946 | Italy | 74/781 B |
| 418972 | 3/1947 | Italy | 74/781 B |
| 428794 | 1/1948 | Italy | 74/781 B |
| 256178 | 2/1949 | Switzerland | 74/781 B |
| 1346068 | 2/1974 | United Kingdom | 74/750 B |
| 2062139 | 7/1983 | United Kingdom | |

Primary Examiner—George H. Krizmanich
Assistant Examiner—Dirk Wright
Attorney, Agent, or Firm—Toren, McGeady, Stanger, Goldberg & Kiel

[57] ABSTRACT

The multi-ratio drive hub with at least three gears comprises a hub spindle (1) on which a driver (5) and a hub sleeve (13) are rotatably mounted. The driver (5) can be coupled with the hub sleeve (13) through at least three different drive torque paths with different step-up and-/or step-down ratios. For the controlling of the torque transmission paths controllable coupling elements are provided which are all formed as controllable pawl ratchets (37, 63) and are controlled by an axial relative movement of their pawl carriers and a lift-out ramp. Such three-speed hubs have relatively small axial dimensions.

14 Claims, 6 Drawing Figures

MULTI-RATIO DRIVE HUB FOR BICYCLES WITH AT LEAST THREE DIFFERENT DRIVE TORQUE PATHS

BACKGROUND OF THE INVENTION

The invention relates to a multi-ratio drive hub with at least three gears for bicycles.

STATEMENT OF PRIOR ART

A three-speed back-pedal-brake hub having a planetary gearing shiftable by claw couplings is known from U.S. Pat. No. 3,828,627. A first claw coupling is provided between the axially displaceably guided hollow wheel of the planetary gearing and a pawl ratchet the freely rotatably mounted pawl carrier of which carries pawls which are in constant engagement with a pawl toothing of the hub sleeve. By means of an axially displaceable claw coupling piece of a second claw coupling the driver of the three-speed hub can be coupled in alternation with the axially displaceable hollow wheel or the planet wheel carrier of the planetary gearing. A pawl freewheel is provided in the drive torque path between the planet wheel carrier and the hub sleeve.

In a three-speed hub of the construction as explained above the claws of the two claw couplings must be displaced over relatively great axial distances. This requires a relatively great axial space occupation of the transmission. Furthermore, in the known three-speed hub, torque-transmitting coupling parts must be displaced axially, which presumes correspondingly powerful guidance or the like and necessitates comparatively expensive constructions.

Furthermore from DE-A-29 40 841 a two-speed freewheel hub for a bicycle is known in which the planetary gearing can be shifted by means of an axially displaceably guided pawl carrier. The pawl carrier carries pawls of a pawl freewheel which engage resiliently in a pawl toothing of the hub sleeve in both the shift positions of the pawl carrier. The pawl carrier further carries pawls of a controllable pawl ratchet which in one of the two shift positions engage in a pawl toothing of the planet wheel carrier of the planetary gearing and in the other shift position are lifted out of the pawl toothing by a lift-out ramp provided axially laterally of the pawl toothing on the planet wheel carrier.

Finally from U.S. Pat. No. 3,809,195 a three-speed back-pedal-brake hub is known the planetary gearing of which is controlled again through claw couplings and pawl freewheels similarly to the three-speed hub according to U.S. Pat. No. 3,828,627. In order to render the back-pedal torque, which acts upon the back-pedal brake device, independent of the shift position of the planetary gearing the axially displaceable hollow wheel of the planetary gearing carries pawls of a pawl freewheel which blocks in the back-pedal direction and which drives the back-pedal brake device through the planetary gearing, which has a step-down effect.

OBJECT OF THE INVENTION

An object of the invention is to reduce the axial space requirement of the gearing and the coupling elements necessary for its control of a multi-ratio drive hub, having at least three speeds, for bicycles.

A further object is to reduce the contructional expense of the multi-ratio hub.

SUMMARY OF THE INVENTION

According to the invention there is provided a multi-ratio drive hub having at least three gears, for bicycles, comprising
 (a) a hub spindle,
 (b) a driver carrying at least one chain wheel and mounted rotatably on the hub spindle;
 (c) a hub sleeve carrying two spoke flanges and mounted rotatably on the hub spindle for one part and the driver on the other;
 (d) a planetary gearing enclosed by the hub sleeve and the driver, including
  a sun wheel having external toothing, arranged non-rotatably on the hub spindle,
  an internally toothed hollow wheel rotatable about the hub spindle in relation to the hub sleeve,
  a planet wheel carrier rotatable about the hub spindle in relation to the hub sleeve, and
  at least one planet wheel meshing with the sun wheel and the hollow wheel and mounted rotatably on the planet wheel carrier;
 (e) controllable coupling elements which couple the driver with the hub sleeve through one of at least three drive torque paths according to choice, a first of the drive torque paths leading from the driver by way of the hollow wheel to the planet wheel carrier and thence to the hub sleeve, a second of the drive torque paths leading from the driver parallel with the planetary gearing to the hub sleeve and a third of the drive torque paths leading from the driver by way of the planet wheel carrier to the hollow wheel and thence to the hub sleeve;
 (f) a control device displaceable manually axially in relation to the hub spindle for the control of the coupling elements;
 (g) a freewheel coupling in at least one of the drive torque paths;
 (h) the improvement comprising forming each of the controllable coupling elements which switch the drive torque paths as a controllable pawl ratchet with a pawl toothing in each case, at least one pawl in each case engaging under resilient initial stress in the pawl toothing and a control element in each case, said pawl or pawls and the control element of each pawl ratchet being axially displaceable in relation to one another by means of the control device in such a way that the control element in a first relative position holds the pawl or pawls liberated for resilient engagement in the pawl toothing and in a second relative position holds the pawl or pawls lifted out of the pawl toothing.

Preferably axial shift distance between the control element and the pawl is shorter than the shift distance to be provided in claw couplings of conventional type. Since all the coupling elements are formed as controllable pawl ratchets the axial space requirement of the multi-ratio hub is relatively small, despite the plurality of gear ratios. The control elements are not arranged in the torque transmission path and can be of comparatively slight dimensions, reducing the dimensions of the multi-ratio hub and the construction expense.

In a preferred embodiment a first controllable pawl ratchet is arranged in a drive torque path from the hollow wheel to the hub sleeve and a second controllable pawl ratchet is arranged in a drive torque path from the driver to the planet wheel carrier. For a three-speed drive hub it is expedient in addition to provide two free-wheel couplings, preferably formed as pawl freewheels, of which a first freewheel coupling is arranged in the drive torque path from the driver to the hollow wheel and a second freewheel coupling is arranged in the drive torque path from the planet wheel carrier to the hub sleeve. The controllable pawl ratchet and the first freewheel coupling can be arranged, by offsetting of the associated pawls, in the circumferential direction, substantially in a plane normal to the axis, rendering possible axially very narrow gear constructions.

The first controllable pawl ratchet is preferably formed so that its pawl carrier, including the pawls, and its pawl toothing, firmly connected with a lift-out ramp for the pawls, can shift axially in relation to one another. The control element of the second controllable pawl ratchet is preferably axially displaceable in relation to the pawl toothing of this pawl ratchet. In this way the two controllable pawl ratchets, expecially in the case of axially overlapping arrangement, can be controlled independently of one another by a control device guided axially displaceably within the hub spindle.

The pawl carrier of the first controllable pawl ratchet is expendiently combined with the pawl toothing of the second controllable pawl ratchet into one axially displaceable unit. It has also proved favourable if the pawl carrier of the first pawl ratchet is formed by the hollow wheel of the planetary gearing and the pawl toothing of the second pawl ratchet is provided on the planet wheel carrier. Then the hollow wheel and the planet wheel carrier are assembled into one common axially displaceable unit.

In the case of the last-mentioned embodiments the shift spring of the gear hub can be stressed in between the hub spindle and the unit. The control element of the second pawl ratchet can be initially stressed by a separate spring which also axially initially stresses the control device displaceable axially in relation to the hub spindle, for example a thrust block with shift rod secured thereto.

The multi-ratio hub according to the invention can be formed as freewheel drive hub or equally as back-pedal-brake hub. In the case of formation as back-pedal brake hub the back-pedal-brake device is preferably coupled with the planet wheel carrier, similarly to known brake hubs. In order that in every gear position of the multi-ratio hub the back-pedal-brake device may be actuated with a back-pedal torque of constant magnitude, it is preferable to provide that the driver is in drive connection with the planet wheel carrier through two pawl ratchets which block in opposite directions of rotation. One of the two pawl ratchets is controllable, this expediently being the above-explained second controllable pawl ratchet. The other pawl ratchet is a pawl freewheel the pawls of which expediently rotate in the axis-normal plane of the second controllable pawl ratchet, but are offset in angle in relation to the pawls of this ratchet. The pawl toothing, which is preferably coupled non-rotatably with or formed on the planet wheel carrier is preferably common to both ratchets.

The pawls of the controllable pawl ratchet are preferably longer in the axial direction than the pawls of the pawl freewheel acting in the opposite direction. The control element of the pawl ratchet is thus capable of lifting only the pawls of the controllable pawl ratchet out of the pawl toothing, while the pawls of the pawl freewheel, provided for the transmission of the back-pedal torque, are liberated for continuing engagement.

In the case of the configuration of the above-explained multi-ratio hub as back-pedal-brake hub the back-pedal torque is transmitted from the driver directly to the planet wheel carrier and thence to the back-pedal brake device. If in the case of this gearing configuration both controllable pawl ratchets are disengaged, the drive torque in the forward direction will be transmitted through a pawl freewheel from the driver to the hollow wheel of the planetary gearing and through a further pawl freewheel from the planet wheel carrier to the hub sleeve. On reverse rotation of the driver the planet wheel carrier will be driven in the reverse direction of rotation, whereby the hollow wheel also rotates in the reverse direction, but with increased rotation rate. In order to prevent the pawl freewheel which blocks in the forward direction of rotation from blocking the reverse rotating movement of the hollow wheel between the driver and the hollow wheel, a claw coupling having rotary play is arranged between this pawl freewheel and the hollow wheel. The rotary play of the claw coupling is so great that the driver can be rotated backwards until the back-pedal-brake device grips, before the pawls of the pawl ratchet which block in the forward drive direction come to block.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
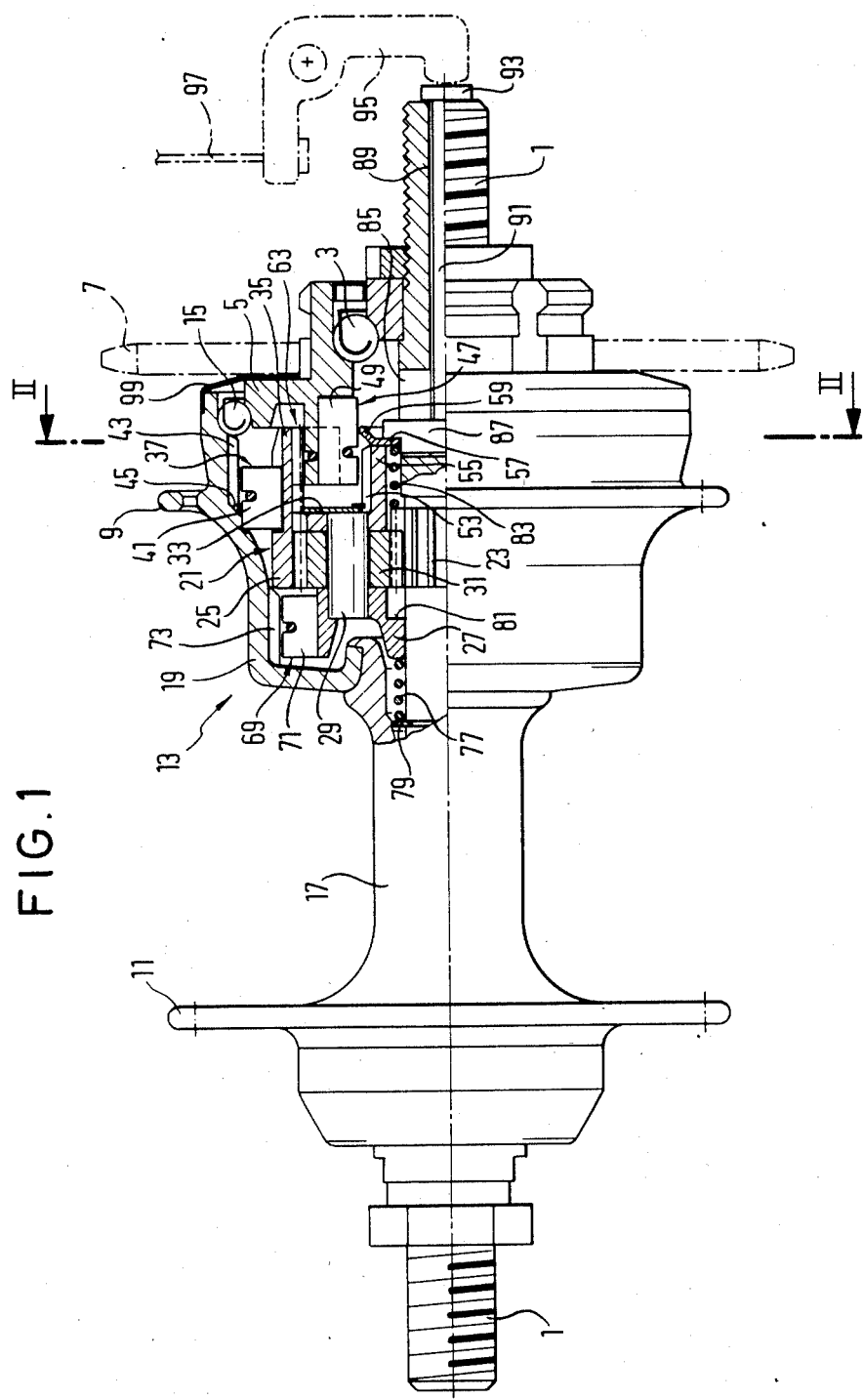
FIG. 1 shows a partially sectional lateral view of a three-speed freewheel drive hub for a bicycle.
Figure 2:
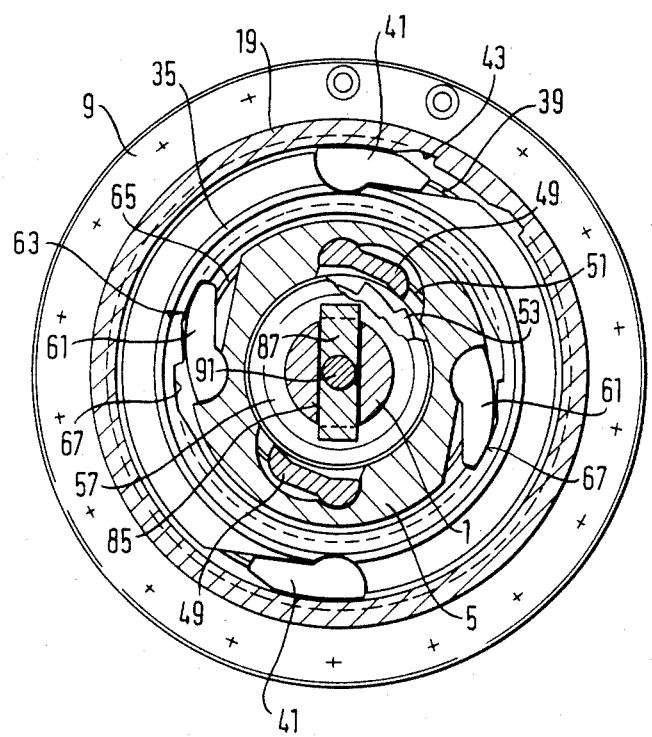
FIG. 2 shows a sectional view of the drive hub seen along a line II—II in FIG. 1.

FIGS. 1 and 2 show a three-speed freewheel drive hub for a bicycle having a hub spindle 1 provided with external threading at the end, on which a driver 5 is rotatably mounted on a ball bearing 3. The driver 5 carries non-rotatably one or more chain wheels, one of which is indicated in dot-and-dash lines at 7. Furthermore a hub sleeve 13 provided with two spoke flanges 9, 11 is rotatably mounted on the hub spindle 1 and is supported at its driver end through a ball bearing 15 on the driver 5 and at its other end through a ball bearing (not shown further) in axially fixed manner on the hub spindle 1. The hub sleeve 13 comprises a first hub part 17 of die-cast light metal or the like and a second hub part 19 pressed from sheet steel or the like. The hub part 17 has a substantially smaller diameter between the two spoke flanges 9, 11 than the hub part 19 which is firmly connected by a press fit with the hub part 17. Together with the driver 5 the hub part 19 mechanically stably encloses a planetary gearing 21. In the hub sleeve 13 as explained above the zones of the hub sleeve which are stressed in the transmission of the drive torque are manufactured wear-resistantly from steel, while the less stressed zones of the hub sleeve consist of light metal, for reasons of weight-saving.

The planetary gearing 21 comprises a sun wheel 23 cut into or secured non-rotatably upon the hub spindle 1, an internally toothed hollow wheel 25 rotatable about the hub spindle 1 in relation to the hub sleeve 13 and a planet wheel carrier 27 rotatable about the hub spindle 1 and having spindles 29 extending parallel with the hub spindle 1, on which spindles planet wheels 31 meshing with the sun wheel 23 and the hollow wheel 25 are rotatably mounted.

The planet wheel carrier 27 and the hollow wheel 25 are fixed axially in relation to one another by means of an annular washer 33 and are displaceable as a unit in the axial direction of the hub spindle 1. On the side of the hollow wheel 25 axially facing the driver 5 there is formed a pawl carrier 35 of a first controllable pawl ratchet 37 blocking in the forward drive direction of the hollow wheel 25. The pawl carrier 37 carries pawls 41 which pivot radially outwards under the action of an annular spring 39 and can engage in a pawl toothing 43 of the hub sleeve 13. On the side of the pawl toothing 43 axially remote from the driver 5 the hub sleeve 13 carries an annular lift-out ramp 45 by means of which the pawls 41 can be lifted out of the pawl toothing 43. FIGS. 1 and 2 show the pawls 41 in the lifted-out position. The pawls 41 of the ratchet 37 are liberated for engagement in the pawl toothing 43 when the hollow wheel 25 is displaced out of the position as illustrated in FIG. 1 to the right towards the driver 5.

A second controllable pawl ratchet 47 is arranged in the drive torque path from the driver 5 to the planet wheel carrier 27. It comprises pawls 49 mounted on the driver 5 which are provided to engage under the action of an annular spring 51 radially inwards in an externally toothed pawl toothing 53 of an annular extension piece 55 of the planet wheel carrier 27 protruding axially towards the driver 5. The pawls 49 of the ratchet 47 are controllable by means of a control disc 57 axially displaceably guided on the hub spindle 1. On its outer edge the control disc 57 carries an annular lift-out ramp 59 by means of which it can lift the pawls 49 out of the pawl toothing 53, as represented in FIGS. 1 and 2. If the control disc 57 is displaced to the right in FIG. 1 towards the driver 5, it liberates the pawls 49 to engage in the pawl toothing 53 for the transmission of the forward drive torque.

As best shown by FIG. 2, the driver 5 carries, offset in the circumferential direction in relation to the pawls 49, further pawls 61 of a pawl freewheel 63 which in the forward drive direction couples the driver 5 with the hollow wheel 25. The pawls 61 are pivoted radially outwards by an annular spring 65 and engage in a pawl toothing 67 on the inner circumference of the pawl carrier extension piece 35 of the hollow wheel 25.

A further pawl freewheel 69 is arranged on the side of the planet wheel carrier 27 remote axially from the driver 5. The pawl freewheel 69 transmits the torque of the planet wheel carrier 27 in the forward drive direction to the hub sleeve 13 and comprises radially outwardly resiliently initially stressed pawls 71 on the planet wheel carrier 27 which engage in a pawl toothing 73 on the inner circumference of the hub sleeve 13. The pawls 71 together with the annular washer 33 fix the hollow wheel 25 in the axial direction on the planet wheel carrier 27.

The planet wheel carrier 27 and thus the hollow wheel 25 are initially stressed axially towards the driver 5 by a helical compression spring 77 surrounding the hub spindle 1. The spring 77 is here stressed in, on the side axially remote from the driver 5, between the planet wheel carrier 27 and a securing ring 79 let into the hub spindle 1. A stop shoulder 81 formed on the planet wheel carrier 27 on the side of the sun wheel 23 remote from the driver limits the axial travel of the planet wheel carrier 27 in a position in which the pawls 41 of the ratchet 37 can engage freely in the pertinent pawl toothing 43. The sun wheel 23 is of such wide dimensioning in the axial direction that the planet wheels 31 mesh with the sun wheel 23 in every position of the planet wheel carrier 27. A second helical compression spring 83 surrounding the hub spindle 1 is arranged between the face of the sun wheel 23 axially facing the driver 5 and the control disc 57 and initially stresses the control disc 57 into its position liberating the pawls 49 for their engagement in the pawl toothing 53.

For the controlling of the ratchets 37 and 47 a thrust block 87 is guided axially displaceably in a slot 85 of the hub spindle 1. The thrust block 87 is seated on a shift rod 91, which is axially displaceably guided in an axial bore 89 of the hub spindle 1 and the end 93 of which, which is remote from the thrust block, protrudes out of the hub spindle 1. The shift rod 91 and thus the thrust block 87 can be displaced manually between three predetermined positions determining the gear change positions of the three-speed hub, through a draw cable 97 or the like by means of a shift lever 95 secured to the hub spindle 1 in a manner not further illustrated.

FIGS. 1 and 2 show the three-speed hub with "hill-climbing gear" engaged in which the planetary gearing 21 reduces the drive-output rotation rate of the hub sleeve 13 in comparison with the drive-input rotation rate of the driver 5. When the hill-climbing gear is engaged the shift lever 95, through the shift rod 91 and the thrust block 87, holds the shift disc 57 and thus the planet wheel carrier 27 and the hollow wheel 25 against the force of the springs 77 and 83 in a position in which the pawls 49 and 41 of the controllable pawl ratchets 47 and 37 are held out of the associated pawl toothings 53 and 43 respectively. The hill-climbing drive torque path proceeds from the chain wheel 7 through the driver 5, the pawl freewheel 63, the hollow wheel 25, the planet wheels 31 supported on the sun wheel 23 to the planet wheel carrier 27 and thence by way of the pawl freewheel 69 to the hub sleeve 13. The hollow wheel 25 in this case rotates at the speed of the driver 5 while the hub sleeve 13 rotates with the slower rotation rate of the planet wheel carrier 27.

If the shift rod 91 is moved by means of the shift lever 95 into a middle position, the "direct" gear or "normal gear" of the three-speed hub is engaged. In this position the stop shoulder 81 of the planet wheel carrier 27 abuts on the face of the sun wheel 23 remote from the driver and the lift-out ramp 45 liberates the pawls 41 of the pawl ratchet 37 to engage in the pawl toothing 43. The control disc 57 of the second pawl ratchet 47 holds the pawls 49 out of the pawl toothing 53. The normal gear torque path proceeds now from the chain wheel 7 by way of the driver 5, the pawl freewheel 63 and the controllable pawl ratchet 37 parallel with the planetary gearing 21 directly to the hub sleeve 13. Thus the hub sleeve 13 rotates at the rotation rate of the driver 5.

If the shift lever 95 is liberated by one further step, the spring 83 moves the control disc 57 towards the driver 5 out of the path of movement of the pawls 49 of the second controllable pawl ratchet 47. The pawls 49 are then freed to engage in the pawl toothing 53. The pawls 41 of the pawl ratchet 37 can still engage as before freely in the pawl toothing 43. In this position the three-speed hub is situated in the "fast gear" in which the planetary gearing 21 steps up the drive-output rotation rate of the hub sleeve 13 in comparison with the drive-input speed of the driver 5. The fast gear torque path proceeds from the chain wheel 7 by way of the driver 5, the pawl ratchet 47, the planet wheel carrier 27, the planet wheels 31 supported on the sun wheel 23 to the hollow wheel 25 and thence by way of the pawl ratchet 37 to the hub sleeve 13. Since the hollow wheel 25 is rotating at higher rate than the planet wheel carrier 27, the pawl toothing 73 of the pawl free-wheel 69 overtakes the pawls 71 held on the planet wheel carrier 27.

Regarded radially the pawl ratchets 37, 47 and the pawl freewheel 63 are arranged one above the other and overlap one another in the axial direction. The pawls of radially successive ratchets are here offset in relation to one another in the circumferential direction, for reasons of space. In total the axial space requirement of the gearing is comparatively small, so that the external contour of the three-speed hub differs only inappreciably from the external contour of conventional free-wheel hubs of sports bicycles. The short style of construction, in the axial direction, of the gearing also results from the manner of controlling of the pawl ratchets 37, 47. For the engagement of the different drive torque paths it is not necessary for the pawls and pawl toothings to be displaced in relation to one another by the whole of the axial width of the pawls, as is necessary in conventional claw couplings. The three-speed hub makes relatively few components suffice, and these are also frequently relatively simple to produce. By way of example the internal toothing of the hollow wheel 25, which meshes with the planet wheels 31, can be manufactured simultaneously with the pawl toothing 43, if the tooth tip of the hollow wheel toothing is somewhat shortened and at least every second tooth is omitted in the region of the pawl toothing 43.

Finally it should also be mentioned that a dust cover ring 99 which covers the bearing gap from the hub sleeve 13 is secured on the driver 5. The ball bearing remote from the driver and not further illustrated in FIGS. 1 and 2 can comprise a steel bearing shell with ball races.

Figure 3:
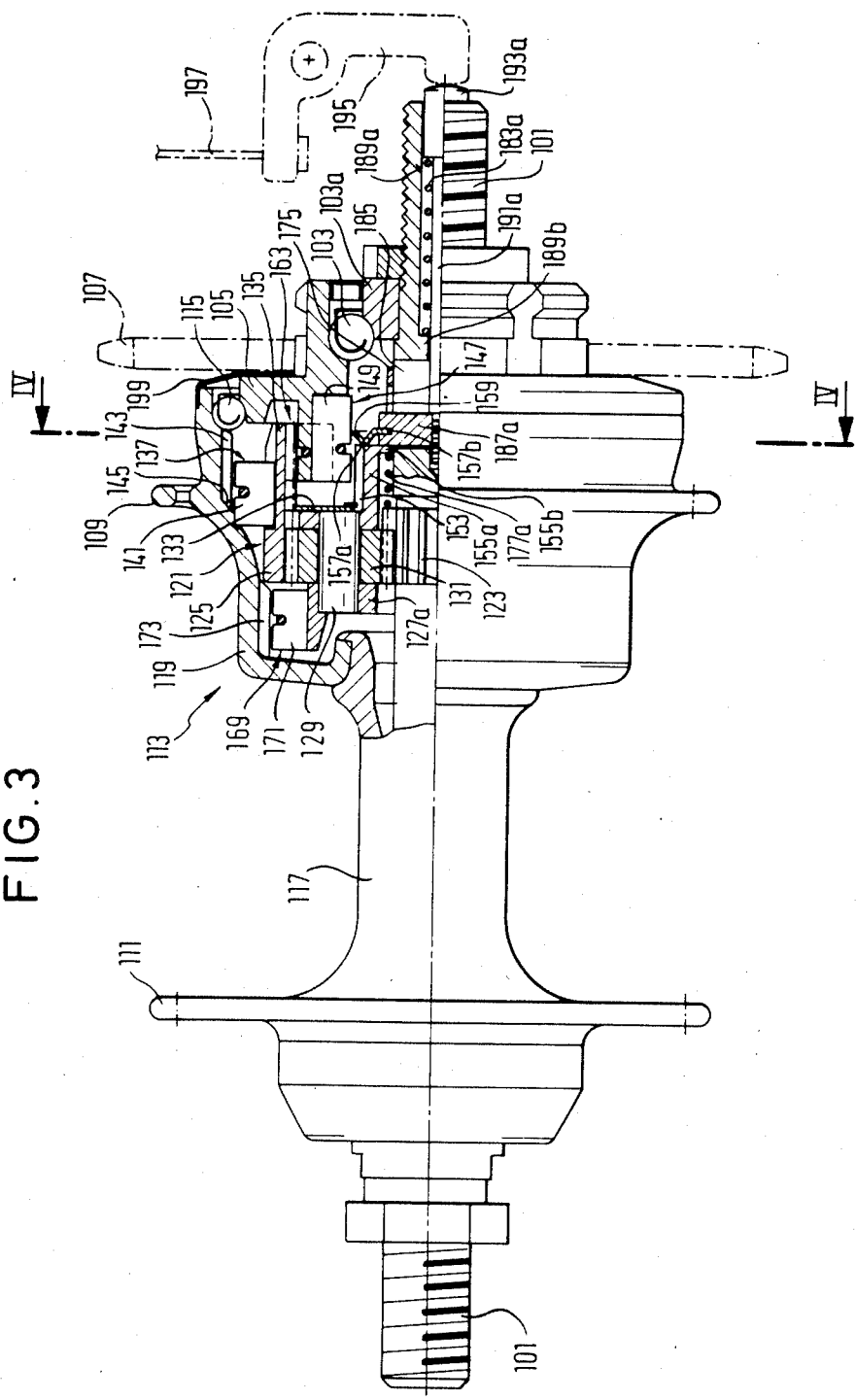
FIG. 3 shows a partially sectional lateral view of another embodiment of a three-speed freewheel drive hub for a bicycle.
Figure 4:
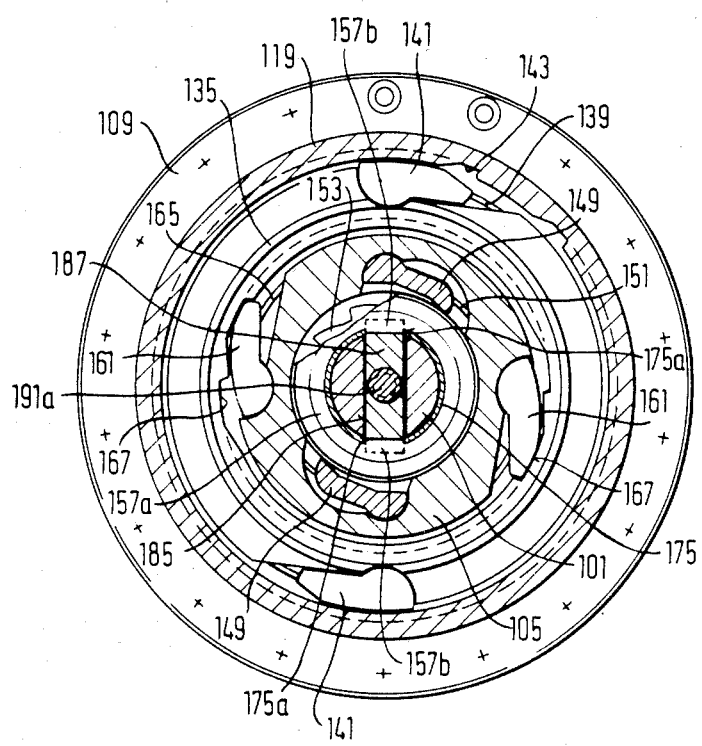
FIG. 4 shows a sectional view of the drive hub seen along a line IV—IV in FIG. 3.

FIGS. 3 and 4 show another embodiment of a three-speed freewheel drive hub for a bicycle, which differs from the three-speed hub according to FIGS. 1 and 2 only in the nature of its control device provided for the controlling of the controllable pawl ratchets. Parts of the three-speed hub according to FIGS. 3 and 4 which conform with parts of the three-speed hub according to FIGS. 1 and 2 are designated with reference numerals increased by the number 100. For the explanation of these parts reference is made to the description of FIGS. 1 and 2. Parts of equal function which are however of different design configuration with regard to the control device are additionally designated with the letter a.

The helical compression spring 177a, corresponding to the helical compression spring 77 in FIGS. 1 and 2, is arranged on the side of the sun wheel 123 axially facing the driver 105. The spring 177a is supported on the driver-side face of the sun wheel 123 on the one part and on a collar 155b, protruding towards the hub spindle radially, of the annular extension piece 155a of the planet wheel carrier 127a on the other part. The second helical compression spring 183a is arranged in the axial bore 189a of the hub spindle 101 and surrounds the control rod 191a. The spring 183a is clamped in between a head 193a, forming the axially outer end of the control rod 191a, and a collar 189b on the sun wheel side of the hub spindle 101. The springs 177a and 183a initially stress the planet wheel carrier 127a and the shift rod 191a respectively and thus the thrust block 187a towards the driver 105.

The control disc 157a controlling the pawl ratchet 147 is of annular formation and carries on its internal circumference noses 157b which fix the control disc 157a axially and radially in slots on the radial end face of the thrust block 187a. The noses 157b are fixed in the circumferential direction of the hub spindle 101 by a sleeve 175 which is axially displaceable on the hub spindle 101. The sleeve 175, as may best be seen from FIG. 4, comprises axial slots 175a which extend in the axial direction past the noses 157b. The axial length of the sleeve 175 is so selected that it fixes the noses 157b in every axial position of the thrust block 187a. On the other hand the sleeve 175 forms a stop part which, in the normal gear and the fast gear of the three-speed hub, limits the axial stroke of the planet wheel carrier 127a, as the driver-side collar 155b on the one hand and a bearing cone 103a of the ball bearing 103 abut on the sleeve 175. The slots 175a of the sleeve 175 are axially of such long dimensions that the thrust block 187a can move out beyond the normal gear position into the fast gear position adjacent to the driver 105.

Figure 5:
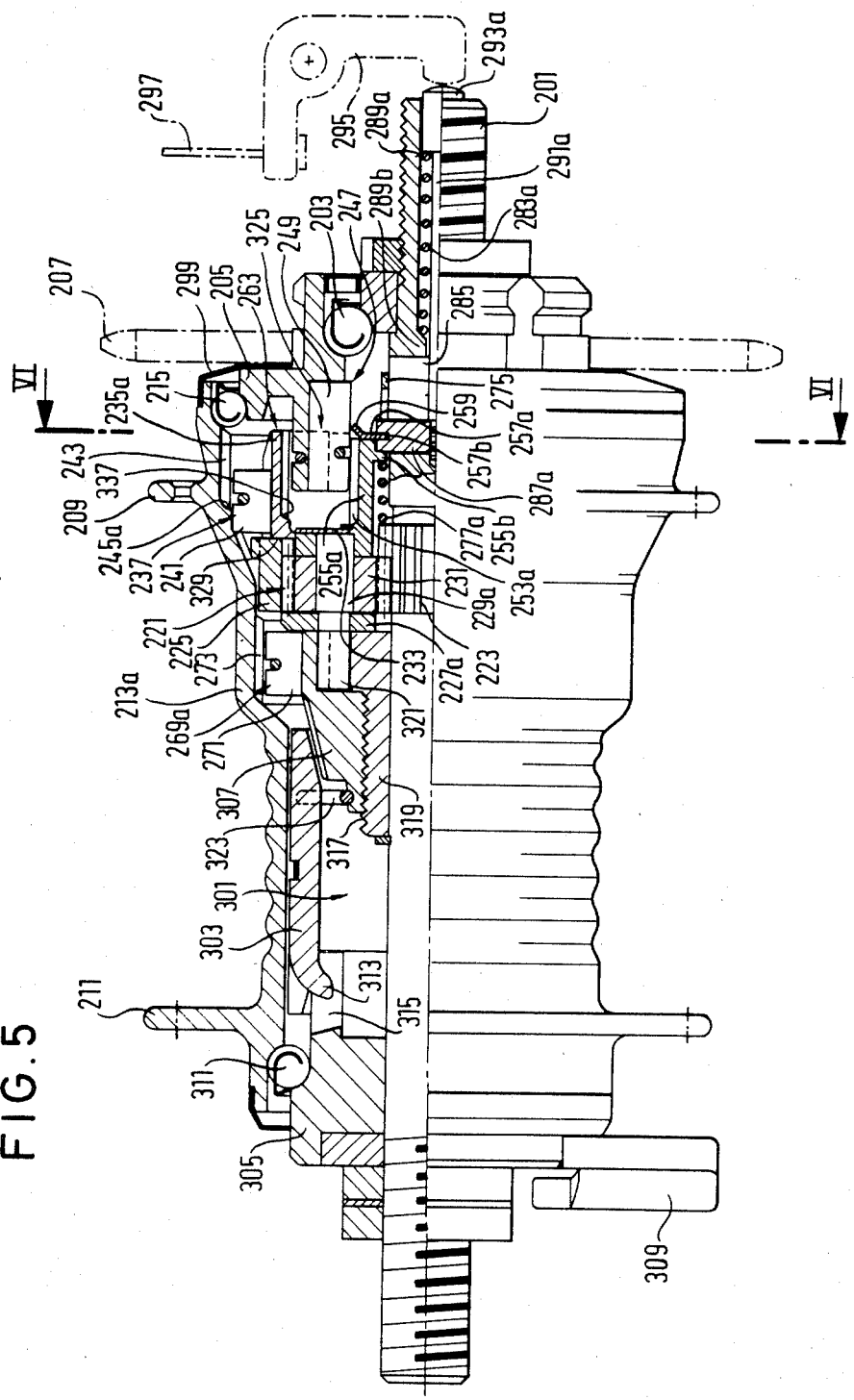
FIG. 5 shows a partially sectional lateral view of a three-speed back-pedal-brake hub for a cycle and FIG. 6 shows a sectional view of the brake hub seen along a line VI—VI in FIG. 5.
Figure 6:
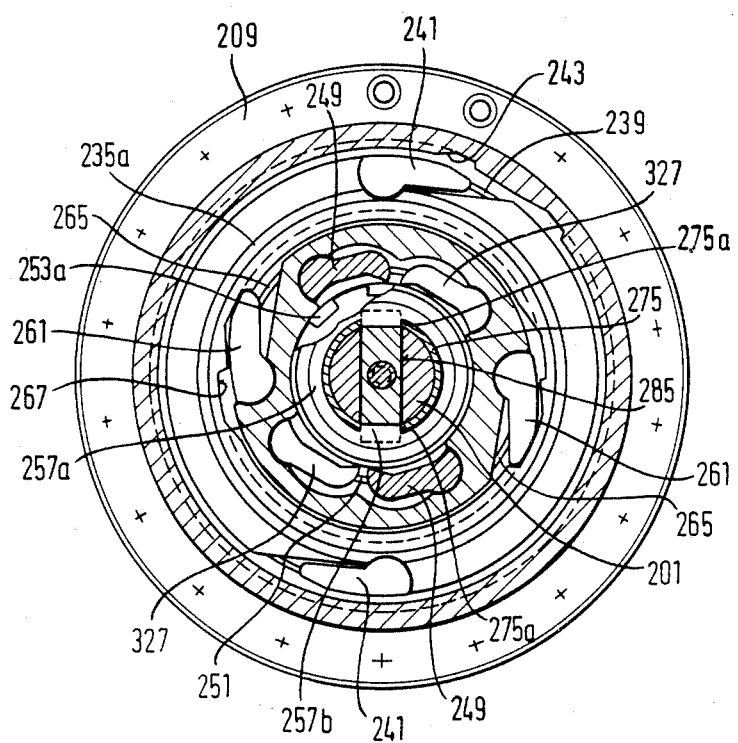

FIGS. 5 and 6 show a three-speed back-pedal-brake hub for a bicycle which differs from the three-speed hub according to FIGS. 3 and 4 essentially only in the parts necessary for the back-pedal-brake device and its control. Parts which are equal in function with corresponding parts of the three-speed hubs according fo FIGS. 1 to 4 are designated in FIGS. 5 and 6 with reference numerals increased in comparison with FIGS. 1 and 2 by the number 200 or in comparison with FIGS. 3 and 4 by the number 100. For explanation reference is made to the description of FIGS. 1 to 4. In so far as the parts differ by reason of the back-pedal-brake function only in their design formation, but not as regards their function, from parts in FIGS. 1 to 4, they are again characterised by the letter a.

On the side of the planetary gearing 221 axially remote from the driver 205 the brake hub comprises a back-pedal-brake device 301. The back-pedal-brake device 301 comprises a substantially cylindrical, radially expandable, brake jacket 303, possibly multi-part in the circumferential direction and surrounding the hub spindle 201, the axial ends of which jacket are supported on the oblique faces of brake cones 305 and 307 which taper axially towards one another. The brake cone 305 is seated on the hub spindle 201 and carries non-rotatably a brake link 309 which conducts the brake reaction torque away to the bicycle frame. The brake cone 305 at the same time forms a bearing cone for a ball bearing 311 carrying the hub sleeve 313. On the brake jacket 303 there are formed guide noses 313 which engage in axial slots 315 of the brake cone 305 and guide the brake jacket 303 non-rotatably but axially and radially movably.

The brake cone 307 is screwed on to a threading 317 of a threaded sleeve 319 rotatably mounted on the hub spindle 201. The threaded sleeve 319 is coupled non-rotatably with the planet wheel carrier 227a through spindle extensions 321 of the spindles 229a of the planet wheel carrier 227a which carry the planet wheels 231. The rotating movement of the brake cone 307 in relation to the brake jacket 303 fast with the hub spindle is braked by friction by means of a loop spring 323 held non-rotatably on the brake jacket 303. If the planet wheel carrier 227a and thus the threaded sleeve 319 are driven in the forward direction, the brake cone 307 is screwed against the planet wheel carrier 227a and the back-pedal brake is released. If the planet wheel carrier 227a is driven in the back-pedalling direction of rotation, the brake cone 307 drives the brake jacket 303 radially outwards against the cylindrical internal circumference of the hub sleeve 213a.

In contrast to the multi-ratio hubs according to FIGS. 1 to 4, the pawls 271 of the pawl freewheel 269a are seated not directly on the planet wheel carrier but on the brake cone 307, which however, in the transmission of the drive torque in the forward direction of rotation, screws itself non-rotatably on to the planet wheel carrier 227a.

In order that the back-pedal torque applied through the chain wheel 207 may be converted into a brake moment independent of the gear position of the three-speed hub, a further pawl freewheel 325 which blocks in the back-pedal direction of rotation is provided in the torque-transmission path between the driver 205 and the planet wheel carrier 227a. As best shown by FIG. 6, the pawl free-wheel 325 has pawls 327 mounted on the driver 205 and directed oppositely to the pawls 249, which pawls 327 likewise engage in the pawl toothing 253a provided on the tubular extension 255a of the planet wheel carrier 227a. For this purpose the pawl toothing 253a is equipped with mutually opposed detent tooth flanks. The pawls 327 are arranged axially outside the stroke of movement of the control disc 257a, so that in every gear position of the three-speed hub they can engage under resilient initial stress in the pawl toothing 253a. For this purpose the pawls 237 are made shorter in the axial direction than the pawls 249. The annular spring 251 can be used in common for the resilient initial stressing of the pawls 327 and of the pawls 249.

The back-pedal torque of the driver is transmitted in every gear position of the three-speed hub through the pawl freewheel 327, the planet wheel carrier 227a, the brake sleeve 319 and the threading 317 to the brake cone 307. The brake cone 307 is shifted axially towards the brake cone 315 by the back-pedal torque, whereby the brake jacket 303 is expanded radially.

In the back-pedalling rotating movement of the planet wheel carrier 227a the hollow wheel 225 will also be rotated in the reverse direction. The hollow wheel 225 rotates at higher rotation rate than the driver 205 and could, since it overtakes the pawls 261, mounted on the driver 205, of the pawl freewheel 263 in the blocking direction, block the further rotating movement of the driver 205 in the reverse direction of rotation. In order to prevent this within the actuation angle of rotation of the back-pedal-brake device 301, the pawl carrier 235a carrying the pawl toothing 267 of the pawl freewheel 263 is coupled non-rotatably but with a predetermined play in rotation with the hollow wheel 225 through a claw coupling 329. The rotational play is so dimensioned that, taking account of the transmission ratio of the planetary gearing 221, it corresponds approximately to the angle of rotation of the threaded sleeve 319 necessary for the actuation of the back-pedal-brake device 301. If the ratio of rotation speeds between planet wheel carrier 227a and hollow wheel 225 amounts to about 3:4, then the hollow wheel 225 leads the planet wheel carrier 227a within one revolution of the planet wheel carrier 227a by ⅓ revolution. Thus it is sufficient if the claw coupling 329 has a rotational play of about 40° for an axial travel of the brake cone 307 of about 5 mm.

In contrast to the three-speed hubs according to FIGS. 1 to 4, in the back-pedal-brake hub according to FIGS. 5 and 6 the hollow wheel 225 is not axially displaceably guided. Rather the planet wheel carrier 227a is connected through the annular washer 233 only with the pawl carrier 235a into an axially movable unit. A variant of the back-pedal hub is not further illustrated in which the annular extension piece 255a is arranged non-rotatably but axially displaceably in relation to the axially fixed planet wheel carrier 227a by means of a claw coupling or the like. The axially displaceable unit utilised for controlling the pawl ratchet 237 then consists of the annular extension piece 255a, the annular washer 233 and the pawl carrier 235a, while the planetary gearing 221 is axially fixedly arranged.

In principle the controlling of the torque paths of the three-speed hub as explained by reference to FIGS. 1 to 4 can also be used in the back-pedal-brake device according to FIGS. 5 and 6. In order to be able securely to exclude the blocking of the planetary gearing in the back-pedalling direction by pawls overtaken in the blocking direction, the control system can be modified as follows. The lift-out ramp 245a of the first controllable pawl ratchet 237 is so dimensioned that the pawls 241 are held out of the pawl toothing 243 both in the hill-climbing gear position remote from the driver and in the normal gear position. The pawl freewheel 263 is likewise formed as a controllable pawl ratchet, and on the side of the pawl toothing 267 axially remote from the driver 205 a lift-out ramp 337 is fixedly arranged on the pawl carrier 235a and holds the pawls 261 out of the pertinent pawl toothing 267 in the normal gear position and the fast gear position, adjacent to the driver 205, of the planet wheel carrier 227a. Only in the fast gear position is the pawl ratchet 237 freed for engagement of its pawls 241 in the pawl toothing 243, while the pawl ratchet 247 is connected into the torque path both in the normal gear position and in the fast gear position.

In the hill-climbing gear position the torque path proceeds from the chain wheel 207 by way of the driver 205, the controllable pawl ratchet 263, the hollow wheel 225, the planet wheel carrier 227a and the brake cone 307 through the pawl freewheel 269a to the hub sleeve 213a. The pawl ratchets 237 and 247 are set out of action.

In the normal gear position the torque path proceeds in the forward direction from the chain wheel 207 to the driver 205, the pawl ratchet 247, the planet wheel carrier 227a and the brake cone 307 by way of the pawl freewheel 269a to the hub sleeve 213a. The pawl ratchets 237 and 263 are set out of action.

In the fast gear position the forward drive torque path proceeds from the chain wheel 207 by way of the driver 205, the pawl ratchet 247, the planet wheel carrier 227a to the hollow wheel 225 and thence by way of the pawl ratchet 237 to the hub sleeve 213a. The pawl ratchet 263 is set out of action while the pawls 271 of the pawl freewheel 269a are overtaken by the pawl toothing 273.

The gear-change configuration of the three-speed hub as explained above can of course also be used in free-wheel hubs of the kind as described with reference to FIGS. 1 to 4. The advantage of this gearing design is that it can be changed easily and when used with back-pedal-brake hubs the back-pedal-brake device is always ready for use, without the back-pedalling distances varying in dependence upon the gear-change position.

While specific embodiments of the invention have been shown and described in detail to illustrate the application of the inventive principles, it will be understood that the invention may be embodied otherwise without departing from such principles.

What is claimed is:

1. In a multi-ratio drive hub having at least three gears, for bicycles, comprising
   (a) a hub spindle;
   (b) a driver carrying at least one chain wheel and mounted rotatably on the hub spindle;
   (c) a hub sleeve carrying two spoke flanges and mounted rotatably on the hub spindle for one part and the driver on the other;
   (d) a planetary gearing enclosed by the hub sleeve and the driver, including
      a sun wheel having external toothing, arranged non-rotatably on the hub spindle,
      an internally toothed hollow wheel rotatable about the hub spindle in relation to the hub sleeve,
      a planet wheel carrier rotatable about the hub spindle in relation to the hub sleeve, and
      at least one planet wheel meshing with the sun wheel and the hollow wheel and mounted rotatable on the planet wheel carrier;
   (e) controllable coupling elements which couple the driver with the hub sleeve through one of at least three drive torque paths according to choice, a first of the drive torque paths leading from the driver by way of the hollow wheel to the planet wheel carrier and thence to the hub sleeve, a second of the drive torque paths leading from the driver parallel with the planetary gearing to the hub sleeve and a third of the drive torque paths leading from the driver by way of the planet wheel carrier to the hollow wheel and thence to the hub sleeve,
   (f) a control device displaceable manually axially in relation to the hub spindle for the control of the coupling elements;
   (g) a free wheel coupling in at least one of the drive torque paths,
   (h) the improvement comprising forming each of the controllable coupling elements which switch the drive torque paths as a controllable pawl ratchet with a pawl toothing in each case, at least one pawl in each case engaging under resilient initial stress in the pawl toothing and a control element in each case, said pawl or pawls and the control element of each pawl ratchet being axially displaceable in relation to one another by means of the control device in such a way that the control element in a first relative position holds the pawl or pawls liberated for resilient engagement in the pawl toothing and in a second relative position holds the pawl or pawls lifted out of the pawl toothing, a first controllable pawl ratchet is arranged in a drive torque path from the hollow wheel to the hub sleeve and a second controllable pawl ratchet is arranged in a drive torque path from the driver to the planet wheel carrier, the control element of the second controllable pawl ratchet comprises an annular lift-out ramp and is displaceable in relation to the hub spindle by means of the control device, and the pawl toothing of the second controllable pawl ratchet is formed as external pawl toothing of an annular part connected non-rotatably with the planet wheel carrier and the driver is formed as pawl carrier of the pawl or pawls of the second controllable pawl ratchet.

2. A multi-ratio drive hub according to claim 1, wherein the pawl toothing and a pawl carrier carrying the pawl or pawls of the first controllable pawl ratchet are axially displaceable in relation to one another by means of the control device and wherein the control element is formed as a lift-out ramp arranged axially laterally of the pawl toothing and connected axially non-movably therewith.

3. A multi-ratio drive hub according to claim 2, wherein the hollow wheel is axially displaceable and is formed as pawl carrier for the pawl or pawls of the first controllable pawl ratchet and wherein the lift-out ramp and the pawl toothing are arranged fixedly on the hub sleeve.

4. In a multi-ratio drive hub having at least three gears, for bicycles, comprising
   (a) a hub spindle;
   (b) a driver carrying at least one chain wheel and mounted rotatably on the hub spindle;
   (c) a hub sleeve carrying two spoke flanges and mounted rotatably on the hub spindle for one part and the driver on the other;
   (d) a planetary gearing enclosed by the hub sleeve and the driver, including
      a sun wheel having external toothing, arranged non-rotatably on the hub spindle,
      an internally toothed hollow wheel rotatable about the hub spindle in relation to the hub sleeve,
      a planet wheel carrier rotatable about the hub spindle in relation to the hub sleeve, and
      at least one planet wheel meshing with the sun wheel and the hollow wheel and mounted rotatable on the planet wheel carrier;
   (e) controllable coupling elements which couple the driver with the hub sleeve through one of at least three drive torque paths according to choice, a first of the drive torque paths leading from the driver by way of the hollow wheel to the planet wheel carrier and thence to the hub sleeve, a second of the drive torque paths leading from the driver parallel with the planetary gearing to the hub sleeve and a third of the drive torque paths leading from the driver by way of the planet wheel carrier to the hollow wheel and thence to the hub sleeve,
   (f) a control device displaceable manually axially in relation to the hub spindle for the control of the coupling elements;
   (g) a freewheel coupling in at least one of the drive torque paths,
   (h) the improvement comprising forming each of the controllable coupling elements which switch the drive torque paths as a controllable pawl ratchet with a pawl toothing in each case, at least one pawl in each case engaging under resilient initial stress in the pawl toothing and a control element in each case, said pawl or pawls and the control element of each pawl ratchet being axially displaceable in relation to one another by means of the control device in such a way that the control element in a first relative position holds the pawl or pawls liberated for resilient engagement in the pawl toothing and in a second relative position holds the pawl or pawls lifted out of the pawl toothing, a first controllable pawl ratchet is arranged in a drive torque path from the hollow wheel to the hub sleeve and a second controllable pawl ratchet is arranged in a drive torque path from the driver to the planet wheel carrier, the first controllable pawl ratchet comprises a ratchet part arranged in the drive torque path, connected non-rotatably with the hollow wheel and displaceable axially in relation to the hub spindle, wherein the second controllable pawl ratchet likewise comprises a ratchet part arranged in the drive torque path, connected non-rotatably with the planet wheel carrier and displaceable axially in relation to the hub spindle, and wherein the ratchet parts are mounted to form a unit axially displaceable in common by means of the control device, the unit is axially initially stressed by means of a spring in the direction of release of the pawl engagement of the first pawl ratchet, and in a position of the first controllable pawl ratchet permitting the pawl engagement a stop part limits the movement stroke of the unit and wherein the control element of the second controllable pawl ratchet is displaceable axially beyond the position limited by the stop part, independently of the unit.

5. A multi-ratio drive hub according to claim 4, wherein the hollow wheel and the planet wheel carrier are firmly connected with the ratchet parts and are axially displaceable as a unit by means of the control device.

6. A multi-ratio drive hub according to claim 4, wherein the control element of the second controllable pawl ratchet is axially fixedly connected with a shift rod axially displaceable in an axial bore of the hub spindle and by means of a second spring initially stresses the control element of the second controllable pawl ratchet with the same axial direction as the spring which initially stresses the unit.

7. A multi-ratio drive hub according to claim 6, wherein the second spring encloses the hub spindle and is stressed in between the sun wheel and the control element of the second controllable pawl ratchet.

8. A multi-ratio drive hub according to claim 6, wherein the second spring is arranged in the axial bore of the hub spindle, which bore accommodates the shift rod.

9. In a multi-ratio drive hub having at least three gears, for bicycles, comprising
(a) a hub spindle;
(b) a driver carrying at least one chain wheel and mounted rotatably on the hub spindle;
(c) a hub sleeve carrying two spoke flanges and mounted rotatably on the hub spindle for one part and the driver on the other;
(d) a planetary gearing enclosed by the hub sleeve and the driver, including
a sun wheel having external toothing, arranged non-rotatably on the hub spindle,
an internally toothed hollow wheel rotatable about the hub sleeve,
a planet wheel carrier rotatable about the hub spindle in relation to the hub sleeve, and
at least one planet wheel meshing with the sun wheel and the hollow wheel and mounted rotatable on the planet wheel carrier;
(e) controllable coupling elements which couple the driver with the hub sleeve through one of at least three drive torque paths according to choice, a first of the drive torque paths leading from the driver by way of the hollow wheel to the planet wheel carrier and thence to the hub sleeve, a second of the drive torque paths leading from the driver parallel with the planetary gearing to the hub sleeve and a third of the drive torque paths leading from the driver by way of the planet wheel carrier to the hollow wheel and thence to the hub sleeve,
(f) a control device displaceable manually axially in relation to the hub spindle for the control of the coupling elements;
(g) a freewheel coupling in at least one of the drive torque paths,
(h) the improvement comprising forming each of the controllable coupling elements which switch the drive torque paths as a controllable pawl ratchet with a pawl toothing in each case, at least one pawl in each case engaging under resilient initial stress in the pawl toothing and a control element in each case, said pawl or pawls and the control element of each pawl ratchet being axially displaceable in relation to one another by means of the control device in such a way that the control element in a first relative position holds the pawl or pawls liberated for resilient engagement in the pawl toothing and in a second relative position holds the pawl or pawls lifted out of the pawl toothing, for the formation of the first drive torque path a pawl ratchet is arranged in the drive torque path from the driver to the hollow wheel and the freewheel coupling is arranged in the drive torque path from the planet wheel carrier to the hub sleeve, the driver is formed as pawl carrier for the pawl ratchet arranged in the drive torque path between the driver and the hollow wheel, and the pawl ratchet arranged in the torque path between the driver and the hollow wheel is formed as controllable pawl ratchet the pawls of which are liberated for engagement in an associated pawl toothing in the first torque transmission path but are lifted out of the pawl toothing in the second and third torque paths, by means of a control element.

10. A multi-ratio drive hub according to claim 9, wherein the two controllable pawl ratchets and the pawl ratchet arranged in the torque path leading from the driver to the hollow wheel are arranged one above the other in the radial direction and overlap axially.

11. A multi-ratio drive hub according to claim 1, wherein the hub sleeve consists of two sleeve parts secured coaxially to one another by means of a press connection, of which the one sleeve part is made as a steel pressing and surrounds the planetary gearing and the coupling elements and of which the other sleeve part consists of a material with lower specific gravity than steel.

12. A multi-ratio drive hub according to claim 1, wherein the driver is formed as pawl carrier for pawls of the controllable pawl ratchet and of the pawl freewheel which blocks in the reverse direction of rotation.

13. In a multi-ratio drive hub having at least three gears, for bicycles, comprising
(a) a hub spindle;

(b) a driver carrying at least one chain wheel and mounted rotatably on the hub spindle;

(c) a hub sleeve carrying two spoke flanges and mounted rotatably on the hub spindle for one part and the driver on the other;

(d) a planetary gearing enclosed by the hub sleeve and the driver, including
   a sun wheel having external toothing, arranged non-rotatably on the hub spindle,
   an internally toothed hollow wheel rotatable about the hub spindle in relation to the hub sleeve,
   a planet wheel carrier rotatable about the hub spindle in relation to the hub sleeve, and
   at least one planet wheel meshing with the sun wheel and the hollow wheel and mounted rotatable on the planet wheel carrier;

(e) controllable coupling elements which couple the driver with the hub sleeve through one of at least three drive torque paths according to choice, a first of the drive torque paths leading from the driver by way of the hollow wheel to the planet wheel carrier and thence to the hub sleeve, a second of the drive torque paths leading from the driver parallel with the planetary gearing to the hub sleeve and a third of the drive torque paths leading from the driver by way of the planet wheel carrier to the hollow wheel and thence to the hub sleeve, (f) a control device displaceable manually axially in relation to the hub spindle for the control of the coupling elements;

(g) a freewheel coupling in at least one of the drive torque paths, (h) the improvement comprising forming each of the controllable coupling elements which switch the drive torque paths as a controllable pawl ratchet with a pawl toothing in each case, at least one pawl in each case engaging under resilient initial stress in the pawl toothing and a control element in each case, said pawl or pawls and the control element of each pawl ratchet being axially displaceable in relation to one another by means of the control device in such a way that the control element in a first relative position holds the pawl or pawls liberated for resilient engagement in the pawl toothing and in a second relative position holds the pawl or pawls lifted out of the pawl toothing, the planet wheel carrier is coupled with a back-pedal-brake device arranged on the side of the planetary gearing axially remote from the driver and wherein the driver is in drive connection with the planet wheel carrier through a controllable pawl ratchet which blocks in the forward drive direction and through a pawl freewheel which blocks in the reverse drive direction, in the drive torque path between the driver and the hollow wheel there is arranged a pawl ratchet, a blocking in the forward direction of rotation, with a pawl toothing and at least one pawl held resiliently in engagement with the pawl toothing, and wherein the ratchet part of this pawl ratchet which is connected in the drive torque path with the hollow wheel is coupled non-rotatably but with play in rotation with the hollow wheel by means of a claw coupling.

14. A multi-ratio drive hub according to claim 12, wherein the back-pedal-brake device comprises a radially expandable brake jacket coaxial with the hub sleeve, an externally threaded sleeve coupled non-rotatably with the planet wheel carrier and mounted rotatably on the hub spindle and a brake cone screwed on to the externally threaded sleeve and expanding the brake jacket on back-pedalling drive movement of the planet wheel carrier, wherein between the brake cone and the hub sleeve there is arranged a pawl freewheel blocking in the forward drive direction of the planet wheel carrier, with a pawl toothing and at least one pawl resiliently initially stressed into engagement with the pawl toothing, and wherein the brake cone is formed as pawl carrier for the pawl or pawls of this pawl freewheel.

* * * * *